Patented Feb. 21, 1933

1,898,213

UNITED STATES PATENT OFFICE

EDMOND PRINCE, OF CASSIN-LA DEMI-LUNE, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS OF RECOVERING ACETIC ACID FROM SOLUTIONS OBTAINED IN CELLULOSE DERIVATIVE MANUFACTURE

No Drawing. Application filed December 1, 1926, Serial No. 152,058, and in France February 26, 1926.

This invention relates to a process of treating acetic acid, the principal object of the invention being to provide a process by means of which dilute acetic acid containing cellulose compounds can be prepared for concentration so that the concentration can be accomplished without precipitation of the cellulose compounds.

In the manufacture of cellulose acetate, cellulosic material is usually treated with an acetylating mixture comprising acetic anhydride, acetic acid and a catalyst. After the reaction has terminated, the cellulose acetate is hydrolized if an acetone-soluble product is desired. The acetate is then precipitated with water and separated from the dilute acid by filtration or the like. The dilute acid contains gums and certain other cellulosic products or compounds produced during the reaction.

Ordinarily, when it is desired to concentrate the dilute acetic acid resulting from the manufacture of cellulose acetate by extraction by means of a solvent, the cellulose products which remain dissolved in the dilute acetic acid precipitate as fast as the acetic acid is extracted from its aqueous solution. These cellulose products remain in suspension in the liquid, impeding the decantation and consequently obstructing the working out of the process to such an extent that it is rendered technically useless.

Applicant has found that the precipitation of the cellulose products can be avoided by preliminarily treating, preferably while heated, the acetic acid residue resulting from the manufacture of cellulose acetate, by strong acids. The duration of the treatment and the temperature at which it should be carried on are very variable, depending on the dilution of the acetic acid to be treated, its content of cellulose products and their nature. Generally speaking, a treatment of some hours, with the aid of heat, with less than 1% of strong acid will be sufficient to produce the desired result.

The action of the strong acid employed is explained by the fact that the cellulose compounds dissolved in the acetic acid residue, but which are insoluble in water, are transformed by an operation aptly termed a "degrading action" into degraded cellulosic derivatives which are soluble in water. Consequently, as a suitable strong acid, one should select organic or mineral bodies having an acid function and capable of exercising a degrading action on the water-insoluble cellulose compounds and converting them into water-soluble compounds. After the treatment, the strong acid which has been introduced may be neutralized, if its presence is likely to be harmful to the carrying out of the extraction operations.

The following examples are intended merely as illustrative of the process, but are not to be regarded as limiting the same:

Example I

To acetic acid resulting from the manufacture of cellulose acetate is added sulphuric acid in the proportion of 10 cc. of sulphuric acid at 50° Bé. per litre of 27% acetic acid. The mixture is maintained at 65° C. for six hours. The acid thus treated, after neutralization of the sulphuric acid by sodium carbonate, is ready for the extraction.

Example II

Using the same proportions as set forth in Example I, the same result will be obtained by maintaining the temperature at 90° C. for two hours.

Having thus described my invention, what I claim is:

1. The process of treating dilute acetic acid containing cellulose compounds remaining and resulting from the manufacture of cellulose derivatives after the removal of the cellulose derivatives, which comprises adding a strong acid capable of rendering the cellulose compounds soluble in water to said acetic acid, heating the mixture and extracting the acetic acid.

2. The process of treating dilute acetic acid containing cellulose compounds remaining and resulting from the manufacture of cellulose derivatives after the removal of the cellulose derivatives, which comprises adding a strong mineral acid to said acetic acid, heating the mixture and extracting the acetic acid.

3. The process of treating dilute acetic acid containing cellulose compounds remaining and resulting from the manufacture of cellulose derivatives after the removal of the cellulose derivatives, which comprises adding sulphuric acid to said acetic acid, heating the mixture and extracting the acetic acid.

4. The process of treating dilute acetic acid containing in solution cellulose compounds resulting from the manufacture of cellulose derivatives, which comprises adding to the acetic acid after separation of the cellulose derivative therefrom, sulphuric acid of 50° Bé. concentration in the proportion of 10 c. c. of sulphuric acid to one litre of acetic acid, and heating the mixture.

5. The process of treating dilute acetic acid containing in solution cellulose compounds resulting from the manufacture of cellulose derivatives, which comprises adding to a 27% acetic acid solution after separation of the cellulose derivative therefrom, sulphuric acid of 50° Bé. concentration, in the proportion of 10 c. c. of sulphuric acid to one litre of acetic acid, and heating the mixture to a temperature of 65° C. for six hours.

In testimony whereof I have signed my name to this specification.

EDMOND PRINCE.